United States Patent [19]

Curchack

[11] 4,038,869
[45] Aug. 2, 1977

[54] SIMULATOR FOR SETBACK FOLLOWED BY DRAG

[75] Inventor: Herbert D. Curchack, Rockville, Md.

[73] Assignee: The United States of America as represented by the Secretary of the Army, Washington, D.C.

[21] Appl. No.: 734,922

[22] Filed: Oct. 22, 1976

[51] Int. Cl.² ............................................. G01M 19/00
[52] U.S. Cl. .................................. 73/167; 73/432 SD
[58] Field of Search ..................... 73/167, 12, 432 SD

[56] References Cited

U.S. PATENT DOCUMENTS

| | | | |
|---|---|---|---|
| 3,444,733 | 5/1969 | Curchack | 73/167 |
| 3,597,969 | 8/1971 | Curchack | 73/167 |
| 3,678,745 | 7/1972 | Teng | 73/167 |
| 3,718,041 | 2/1973 | Jones et al. | 73/167 |

Primary Examiner—Richard C. Queisser
Assistant Examiner—Joseph W. Roskos
Attorney, Agent, or Firm—Nathan Edelberg; Robert P. Gibson; Saul Elbaum

[57] ABSTRACT

Projectile component testing. A projectile carrying test components is impacted against a mitigator backed by a momentum exchange mass, inside a tube to simulate setback. As the momentum exchange mass moves following impact it creates a partial vacuum behind it accelerating the projectile to simulate drag. Various means are disclosed controlling the vacuum level.

8 Claims, 3 Drawing Figures

SIMULATOR FOR SETBACK FOLLOWED BY DRAG

RIGHTS OF THE GOVERNMENT

The invention described herein may be manufactured, used, and licensed by or for the U.S. Government for governmental purposes without the payment to me of any royalty thereon.

BACKGROUND OF THE INVENTION

This invention relates to an apparatus for simulating the linear and angular accelerations to which projectiles are subjected when fired from artillery weaponry. Similar simulators are disclosed in U.S. Pat. Nos. 3,444,733 and 3,597,969, issued to Curchack on May 20, 1969, and Aug. 10, 1971, respectively.

The artillery simulators disclosed in the Curchack patents are effective simulators of the accelerations experienced by projectiles within the barrels of artillery weaponry, but are unable to simulate the drag acceleration experienced by projectiles upon leaving the barrel. With the development of double signature safing and arming devices utilizing the launch acceleration or setback to provide one signature and the drag acceleration to provide the other, simulation of both setback and drag has become necessary. The old solution involved the use of two testers to simulate the projectile environment. These testers required artificial restraints on the safing and arming components and could not apply the accelerations in the proper time frame.

A primary object of this invention is to overcome these difficulties and to provide an artillery simulator capable of simulating both setback and drag acceleration.

Another object of this invention is to provide a setback and drag simulator which can also be used to simulate angular accelerations.

A further object is to provide a setback and drag simulator capable of providing a desired level of drag acceleration.

SUMMARY OF THE INVENTION

A projectile containing components to be tested is accelerated by means of a vacuum air gun or other means into a tube where it is decelerated by impact with a mitigator and momentum exchange mass. The impact causes the momentum exchange mass to accelerate, creating a vacuum behind it. This vacuum is used to accelerate the projectile, thereby simulating drag.

DESCRIPTION OF THE PREFERRED EMBODIMENT

Figure 1:
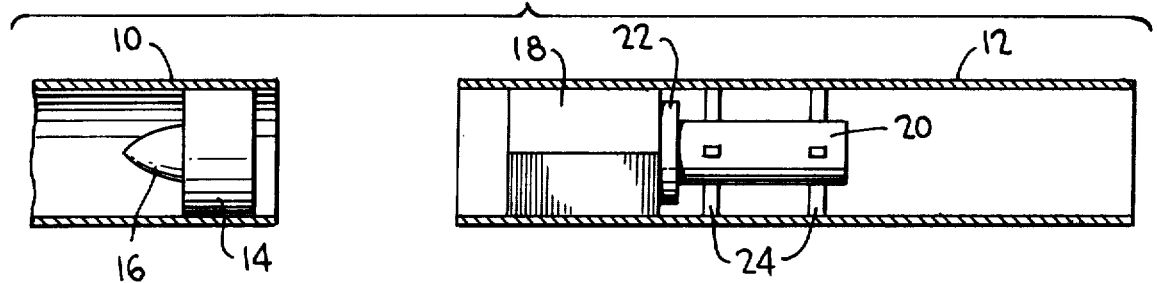
FIG. 1 is a cross-sectional view of a system embodying the principles of this invention.

As shown in FIG. 1, the preferred embodiment of the present invention includes an air gun or other known projectile accelerating means 10, a projectile catch tube 12 and projectile 14. Mounted on projectile 14 are the components to be tested 16. Positioned inside catch tube 12 is a mitigator 18 which may consist of blocks of wood or other crushable material. Preferably the mitigator will be of a square, triangular or other cross-section so as not to substantially block flow through the catch tube. Positioned immediately behind the mitigator 18 is momentum exchange mass 20, on the front of which is mounted piston 22. The momentum exchange mass 20 is slidably supported in catch tube 12 by guide members 24. Piston 22 is designed to have a clearance between it and the walls of catch tube 12, for reasons that will become apparent.

Figure 2:
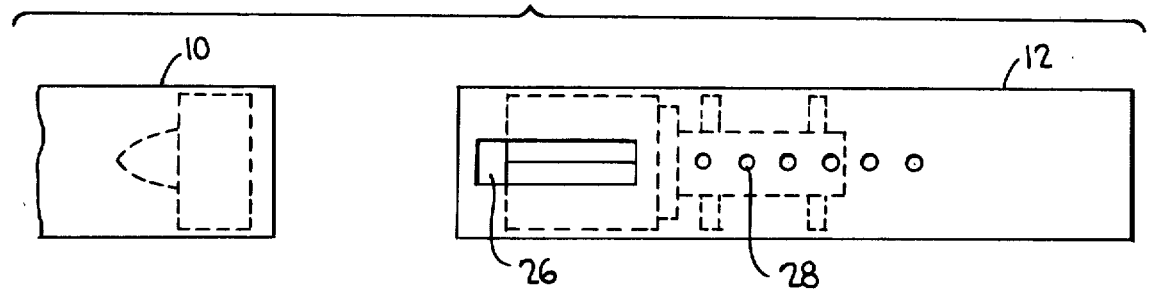
FIG. 2 is an external view of the system of FIG. 1.

As shown in FIG. 2 the catch tube 12 is constructed with a pressure relief port 26 and may also have a plurality of vacuum relief ports 28.

In operation projectile 14 along with test component 16 is accelerated by vacuum air gun means 10, which operates by creating a partial vacuum ahead of the projectile 10 and allowing atmospheric pressure to act on the rear of the projectile, as is well known in the art. The projectile 14 leaves gun 10 and enters catch tube 12 where it impacts mitigator 18. Mitigator 18 is crushed in a controlled fashion to produce the desired deceleration on the projectile 12 and test component 14. The energy of the projectile is partially absorbed by the crushing of the mitigator and the remaining energy and the momentum is transferred to momentum exchange mass 20 causing it to accelerate out the rear of catch tube 12, while the projectile is brought to rest. While mitigator 18 is being crushed, the air pushed ahead of projectile 14 is allowed to escape through pressure relief port 26. The projectile 12 is brought to rest just past the pressure relief port 26.

As momentum exchange mass 20 with attached piston 22 moves to the right a partial vacuum is created behind it. This vacuum creates a pressure differential across projectile 14 which results in projectile 14 being accelerated to the right. The clearance between piston 22 and catch tube 12 allows partial relief of the vacuum, thus controlling the acceleration of projectile 12. By appropriately sizing piston 22 the desired drag acceleration level can be simulated.

Other means can be used, either in combination with the piston clearance or by themselves, to control the acceleration of projectile 14. FIG. 2 illustrates vacuum relief ports 28 in the walls of catch tube 12. By varying the spacing and size of ports 28 it is clear that a variety of drag accleration profiles could be simulated.

Figure 3:
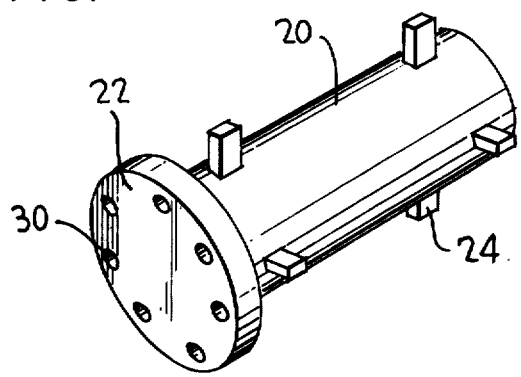
FIG. 3 is a perspective view of a modification of the momentum exchange mass and piston of the system of FIG. 1.

Another way to control the vacuum created by piston 22 is shown in FIG. 3. There vacuum relief ports 30 are located on and through the piston 22.

Though not illustrated, if angular accelerations and spin are required for simulation, catch tube 12 can be rotated in the manner taught by the aforementioned Curchack U.S. Pat. No. 3,444,733.

It will be appreciated from the foregoing description that this invention has provided a novel artillery simulator capable of subjecting a component to be tested to launch accelerations (setback, angular acceleration and spin) immediately followed by drag acceleration.

I wish it to be understood that I do not desire to be limited to the exact details of construction shown and described, for obvious modifications can be made by a person skilled in the art.

What is claimed:

1. A system for providing deceleration followed by acceleration to an impacting projectile comprising:
   a. a catch tube for receiving said projectile;
   b. deceleration means normally positioned in said catch tube to provide a deceleration reaction to said projectile when said projectile enters said catch tube; and c. acceleration means positioned in said catch tube to accelerate said projectile;

d. whereby the launch setback followed by drag experienced by artillery launched fuzes may be simulated.

2. The system of claim 1 wherein said deceleration means comprises a momentum exchange mass to be accelerated by the impact of said projectile.

3. The system of claim 2 wherein said acceleration means comprises piston means for creating a vacuum ahead of said projectile in said catch tube.

4. The system of claim 3 wherein said piston means is mounted on said momentum exchange mass.

5. The system of claim 3 further comprising vacuum control means to control the acceleration of said projectile in said catch tube by partially relieving the vacuum created ahead of said projectile.

6. The system of claim 5 wherein said vacuum control means comprises holes in said catch tube.

7. The system of claim 5 wherein said vacuum control means comprises a clearance between said piston means and said catch tube.

8. The system of claim 5 wherein said vacuum control means comprises holes through said piston means.

* * * * *